United States Patent [19]

Sugeno

[11] Patent Number: 5,168,019
[45] Date of Patent: Dec. 1, 1992

[54] NONAQUEOUS ELECTROLYTE SECONDARY BATTERY

[75] Inventor: Naoyuki Sugeno, Fukushima, Japan

[73] Assignee: Sony Corporation, Tokyo, Japan

[21] Appl. No.: 850,095

[22] Filed: Mar. 12, 1992

[30] Foreign Application Priority Data

Mar. 13, 1991 [JP] Japan .................... 3-48422

[51] Int. Cl.$^5$ ........................... H01M 10/40
[52] U.S. Cl. ...................... 429/194; 429/218
[58] Field of Search ............... 429/194, 196, 197, 199, 429/218, 48

[56] References Cited

U.S. PATENT DOCUMENTS

| | | | |
|---|---|---|---|
| 4,228,229 | 10/1980 | Gabano et al. | 429/196 |
| 4,367,266 | 1/1983 | Kalnoki-Kis | 429/101 |
| 4,804,596 | 2/1989 | Ebner et al. | 429/194 |
| 4,818,647 | 4/1989 | Plichta et al. | 429/218 |
| 4,960,657 | 10/1990 | Masuda et al. | 429/194 |
| 4,983,476 | 1/1991 | Slane et al. | 429/218 X |
| 5,053,297 | 10/1991 | Yamahira et al. | 429/194 |
| 5,110,696 | 5/1992 | Shokoohi et al. | 429/218 |

Primary Examiner—Anthony Skapars
Attorney, Agent, or Firm—Hill, Van Santen, Steadman & Simpson

[57] ABSTRACT

A nonaqueous electrolyte secondary battery includes a cathode of a carbon material that can be doped or undoped with lithium, an anode of a primary active material composed of a composite oxide of lithium and cobalt, the cathode and the anode being disposed in a casing. $LiPF_6$ is dissolved in a solvent of propylene carbonate and 1,2-dimethoxyethane, and a powder of $Al_2O_3$ is dispersed in the solution. The dispersion is poured as an electrolytic solution in the casing.

2 Claims, 2 Drawing Sheets ical cally electrolyte secondary batteries with nonaqueous electrolytic solutions composed of organic solvents and electrolytes are characterized by less self-discharge currents and high operating voltages, and available for long-term use. Heretofore, nonaqueous electrolyte secondary batteries are widely used as power supplies for use in electronic wrist watches and also as memory backup power supplies because they are highly reliable and can be used over a long period of time.

NONAQUEOUS ELECTROLYTE SECONDARY BATTERY

BACKGROUND OF THE INVENTION

1. Field of the Invention

The present invention relates to a nonaqueous electrolyte secondary battery employing a nonaqueous electrolyte.

2. Description of the Prior Art

Nonaqueous electrolyte secondary batteries with nonaqueous electrolytic solutions composed of organic solvents and electrolytes are characterized by less self-discharge currents and high operating voltages, and available for long-term use. Heretofore, nonaqueous electrolyte secondary batteries are widely used as power supplies for use in electronic wrist watches and also as memory backup power supplies because they are highly reliable and can be used over a long period of time.

There has been a growing demand for portable power supplies for use in video cameras, compact audio devices, microcomputers, etc. To meet such a demand, attention has been drawn to rechargeable nonaqueous electrolyte secondary batteries for use as lightweight, large capacity power supplies that can be used economically over a long period of time.

Nonaqueous electrolyte secondary batteries that have been proposed have an cathode of lithium or lithium alloy and an anode made of an active material of $MnO_2$, $TiO_3$, $MoS_2$, $V_2O_5$, $WO_3$, $LiCoO_2$, or the like.

The nonaqueous electrolyte secondary battery which has a cathode made of a carbon material that can be doped or undoped with lithium and an anode made of a compound oxide of lithium and cobalt is particularly promising because its voltage is high, it can a high energy density, and its cyclic performance is much better than nonaqueous secondary batteries whose anode is made of metallic lithium or lithium alloy.

Nonaqueous electrolyte secondary batteries employ electrolytes of $LiAsF_6$, $LiPF_6$, $LiBF_4$, $LiClO_4$, etc. It has been reported that use of $LiPF_6$ as the electrolyte gives the electrolytic solution particularly excellent charging/discharging characteristics.

In the case where a nonaqueous electrolyte secondary battery employs an electrolyte of $LiPF_6$ or $LiBF_4$, however, the electrolyte is decomposed, dissociating a hydrofluoric acid which is a free acid, with the result that the discharge capacity of the battery is lowered.

More specifically, if metallic lithium is used as a cathode active material, then since the free acid reacts with metallic lithium thereby to produce lithium fluoride, the discharge capacity is not greatly affected. If $LiPF_6$ or the like is used as an electrolyte, however, the active material is dissolved by the hydrofluoric acid, and the charging/discharging characteristics of the battery are reduced in repeated charging/discharging cycles. When the battery is used at high temperature, this tendency is stronger because the generation of the free acid is accelerated.

It has been proposed to add various additives to electrolytic solutions for solving the above problems to increase the stability of the electrolytic solutions (see, for example, Japanese Laid-Open Patent Publication No. 61-208758). However, the addition of various additives to electrolytic solutions has proven unsatisfactory as they largely affect the battery performances.

OBJECTS AND SUMMARY OF THE INVENTION

In view of the aforesaid drawbacks of the conventional nonaqueous electrolyte secondary batteries, it is an object of the present invention to provide a nonaqueous electrolyte secondary battery which prevents the electrolyte from being decomposed, and exhibits improved battery performances, particularly an improved charging/discharging cyclic performance, a increased useful life, and an increased dielectric strength.

The inventor has found that the aforesaid problems can be solved by adding to the electrolytic solution a material which is capable of trapping a free acid in the electrolytic solution and which does not adversely affect the battery performances. The electrolytic solution comprises an organic solvent which may not be limited to any particular material, and an electrolyte such as $LiPF_6$, $LiAsF_6$, or $LiBF_4$ dissolved in the organic solvent.

The material to be added to the electrolytic solution may be $Al_2O_3$, BaO, CaO, MgO, $SiO_2$, $Li_2O$, or the like, and should preferably be $Al_2O_3$, BaO, or MgO.

According to the present invention, there is provided a nonaqueous electrolyte secondary battery comprising a casing, a cathode disposed in the casing, the cathode being made of a carbon material that can be doped or undoped with lithium, an anode disposed in the casing, the anode being made of a primary active material composed of a composite oxide of lithium and cobalt, an electrolytic solution accommodated in the casing, the electrolytic solution being composed of an organic solvent with an electrolyte of a fluoride such as $LiPF_6$ added thereto, and an additive added to the electrolytic solution, the additive comprising at least one oxide selected from the group consisting of $Al_2O_3$, BaO, and MgO.

One or more oxides selected from the group consisting of $Al_2O_3$, BaO, and MgO serve to absorb and remove a free acid in the electrolyte. Therefore, any decomposition or degrading of the electrolytic solution is suppressed at high temperature and high voltages which tend to produce a free acid in the electrolytic solution.

The added oxide or oxides are not effective to lower the discharge capacity of the nonaqueous electrolyte secondary battery.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

Figure 1:
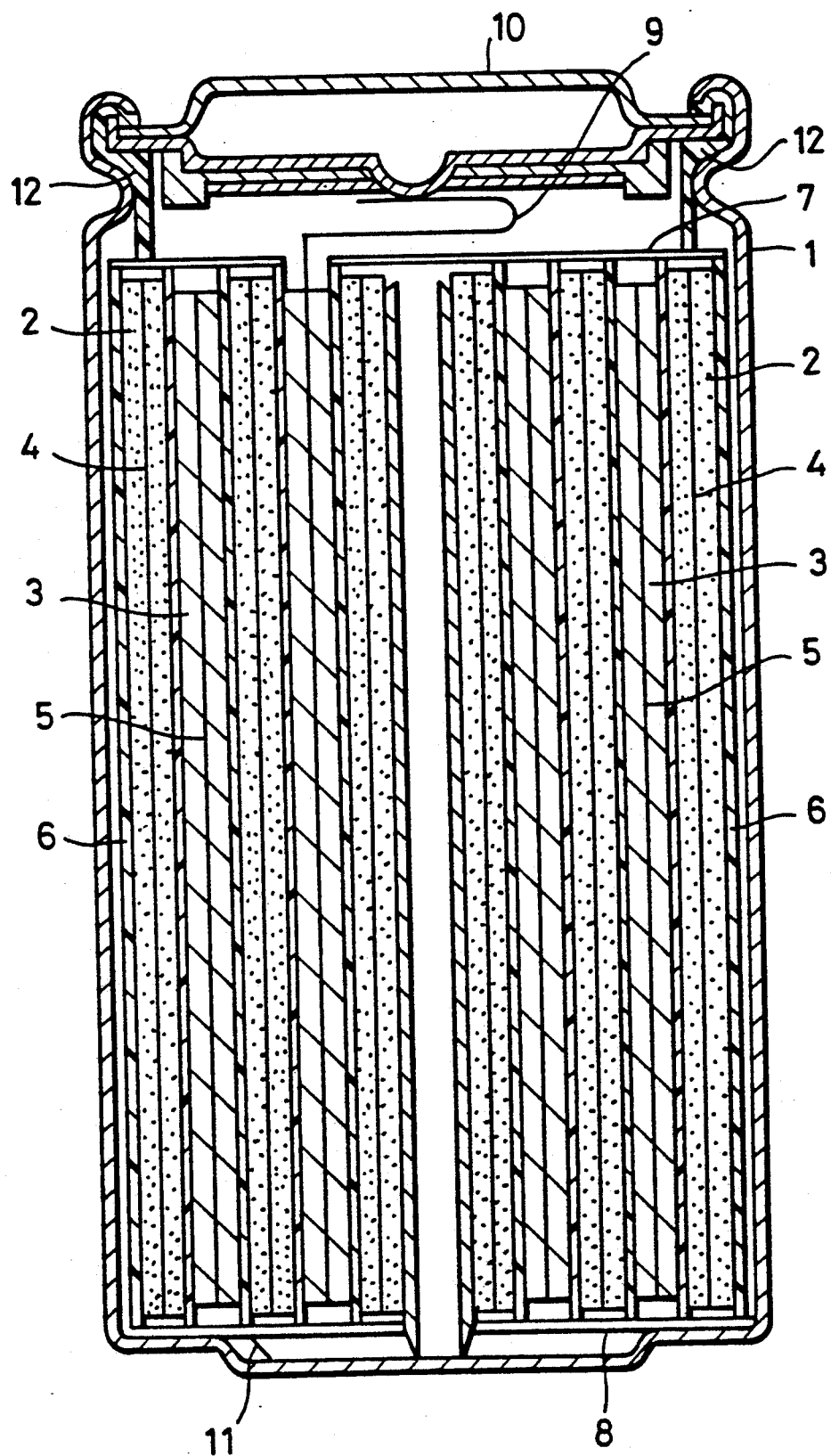
FIG. 1 is a cross-sectional view of a nonaqueous electrolyte secondary battery according to the present invention.

Inventive Example 1:

FIG. 1 shows a nonaqueous electrolyte secondary battery according to the present invention.

As shown in FIG. 1, the nonaqueous electrolyte secondary battery comprises a cylindrical casing 1 made of nickel-plated iron, a cathode 2 in the form of a spirally wound layer, and an anode 3 in the form of a spirally wound layer, the cathode 2 and the anode 3 being disposed in the cylindrical casing 1. The nonaqueous electrolyte secondary battery also includes a cathode current collector 4, an anode current collector 5, a separator 6.

Processes of fabricating the cathode 2 and the anode 3 will be described below.

The cathode 2 was fabricated as follows: Into petroleum pitch as a starting raw material, there was introduced 10~20 per cent by weight of a functional group including oxygen (so-called oxygen crosslinking). Thereafter, the material was baked in a flow of inert gas at 1000° C., thus producing a carbon material which has properties similar to those of glassy carbon. An X-ray diffraction test conducted on the produced carbon material indicated that (002) faces thereof were spaced 3.76 Å. The carbon material was then pulverized into a powder of carbon material particles having an average diameter of 10 $\mu$m. 90 parts by weight of the powder of carbon material particles thus obtained and 10 parts by weight of polyvinylidene fluoride (PVDF), as a binder, were mixed with each other, producing a cathode depolarizing mix. The cathode depolarizing mix was then dispersed in a solvent of N-methyl-2-pyrrolidone, thus producing a slurry. The slurry of the cathode depolarizing mix was then coated on both sides of a web of copper foil having a thickness of 10 $\mu$m for use as a cathode current collector 4. The coated web was then dried, and compressed to shape by a roll press, thereby producing a web-shaped cathode 2.

The anode 3 was fabricated as follows: 1 mol of cobalt carbonate and 0.25 mol of lithium carbonate, as anode active materials, were mixed, and the mixture was baked in air at 900° C. for 5 hours, producing LiCoO$_2$. Then, 0.5 mol of lithium carbonate, 0.6 mol of nickel carbonate, and 0.4 mol of cobalt carbonate were mixed, and the mixture was baked in air at 900° C. for 5 hours, producing LiNi$_{0.6}$Co$_{0.4}$O$_2$. 54.6 parts by weight of LiCoO$_2$, 36.4 parts by weight of LiNi$_{0.6}$Co$_{0.4}$O$_2$, 6 parts by weight of graphite as an electric conductor, and 3 parts by weight of PvDF as a binder were mixed into an anode depolarizing mix. The anode depolarizing mix was then dispersed in a solvent of N-methyl-2-pyrrolidone, thus producing a slurry. The slurry of the anode depolarizing mix was then coated on both sides of a web of aluminum foil having a thickness of 20 $\mu$m for use as an anode current collector 5. The coated web was then dried, and compressed to shape by a roll press, thereby producing a web-shaped anode 3.

The separator 6 comprises a microporous polypropylene film having a thickness of 25 $\mu$m. The cathode 2, the separator 6, and the anode 3 are held in successive layers in the order named, and spirally wound each in a number of turns, thereby to provide a spiral electrode structure as shown in FIG. 1.

Insulation plates 7, 8 are disposed on upper and lower ends, respectively, of the spiral electrode structure. A U-shaped anode lead 9 of aluminum extends upwardly from the anode current collector 5, and is welded to a lower surface of a battery cap 10 that is fitted in the upper end of the casing 1. A cathode lead 11 of nickel extends downwardly from the cathode current collector 5, and is welded to the bottom of the casing 1.

The battery cap 10 is fixed in place by the upper end of casing 1 that is radially inwardly deformed by staking into gripping engagement with the battery cap 10, with an asphalt-coated insulative sealing gasket 12 interposed between the battery cap 10 and the casing 1.

The casing 1 accommodates therein a liquid or dispersion composed of an electrolytic solution comprising a solvent in the form of a mixture of 50% by volume of propylene carbonate and 50% by volume of 1,2-dimethoxyethane, and 1 mol/l of LiPF$_6$ dissolved in the solvent, and 0.5% by weight of powder of AL$_2$O$_3$ dispersed in the electrolytic solution. The electrolytic solution had 100 ppm of a free acid.

To assemble a nonaqueous electrolyte secondary battery according to Inventive Example 1, the cathode 2, the anode 3, and the separator 6 are held in successive layers in the order named, and spirally wound each in a number of turns. The resultant electrode structure is placed in the casing 1, and the anode and cathode leads 9, 11 extending from the anode and cathode current collectors 4, 5 are welded to the lower surface of the battery cap 10 and the bottom of the casing 1, respectively.

Then, the dispersion of the above composition is poured into the casing 1. The sealing gasket 12 and the battery cap 10 are placed in the casing 1, and the upper end of the casing 1 is deformed to hold the battery cap 10 is position, thus completing the nonaqueous electrolyte secondary battery.

The nonaqueous electrolyte secondary battery according to Inventive Example 1 was charged with a current of 1 A and a voltage of 4.1 V continuously for 2.5 hours, and then discharged through a resistor of 6 $\Omega$ at a voltage of 2.5 V until a final discharged voltage is reached. The above charging/discharging cycle was repeated 10 times. After the battery was charged in the 11th cycle, the battery was placed in an oven at 45° C. In the oven, the battery was charged with a voltage of 4.10 V continuously for 2.5 hours, and then discharged through a resistor of 6 $\Omega$ at a voltage of 2.5 V until a final discharged voltage is reached. The above charging/discharging cycle was repeated 100 times. The measured discharge capacity of the battery in the above charging/discharging cycles is shown in Table below and FIG. 2.

Inventive Example 2:

A liquid composed of an electrolytic solution comprising a solvent in the form of a mixture of 50% by volume of propylene carbonate and 50% by volume of 1,2-dimethoxyethane, and 1 mol/l of LiPF$_6$ dissolved in the solvent, and 0.5% by weight of barium oxide (BaO) dispersed in the electrolytic solution. The liquid was then poured into the casing 1, producing a cylindrical nonaqueous electrolyte secondary battery which has the same structure as that of the battery according to Inventive Example 1. The nonaqueous electrolyte secondary battery according to Inventive Example 2 was charged and discharged in the same charging/discharging cycles as with Inventive Example 1. The measured discharge capacity of the battery in the above charging/discharging cycles is also shown in Table below and FIG. 2.

Comparative Example:

A nonaqueous electrolyte secondary battery according to Comparative Example was of the same structure as with the batteries according to Inventive Examples 1 and 2 except that no additives (Al$_2$O$_3$, BaO) were added to the electrolytic solution. The nonaqueous electrolyte secondary battery according to Comparative Example was charged and discharged in the same charging/discharging cycles as with Inventive Examples 1 and 2. The measured discharge capacity of the battery in the above charging/discharging cycles is also shown in Table below and FIG. 2.

|  | Inventive Example 1 | Inventive Example 2 | Comparative Example |
|---|---|---|---|
| Discharge capacity (mAh) after 10 cycles | 940 | 945 | 955 |
| Discharge capacity (mAh) after 100 cycles at 45° C. | 685 | 670 | 550 |

Figure 2:
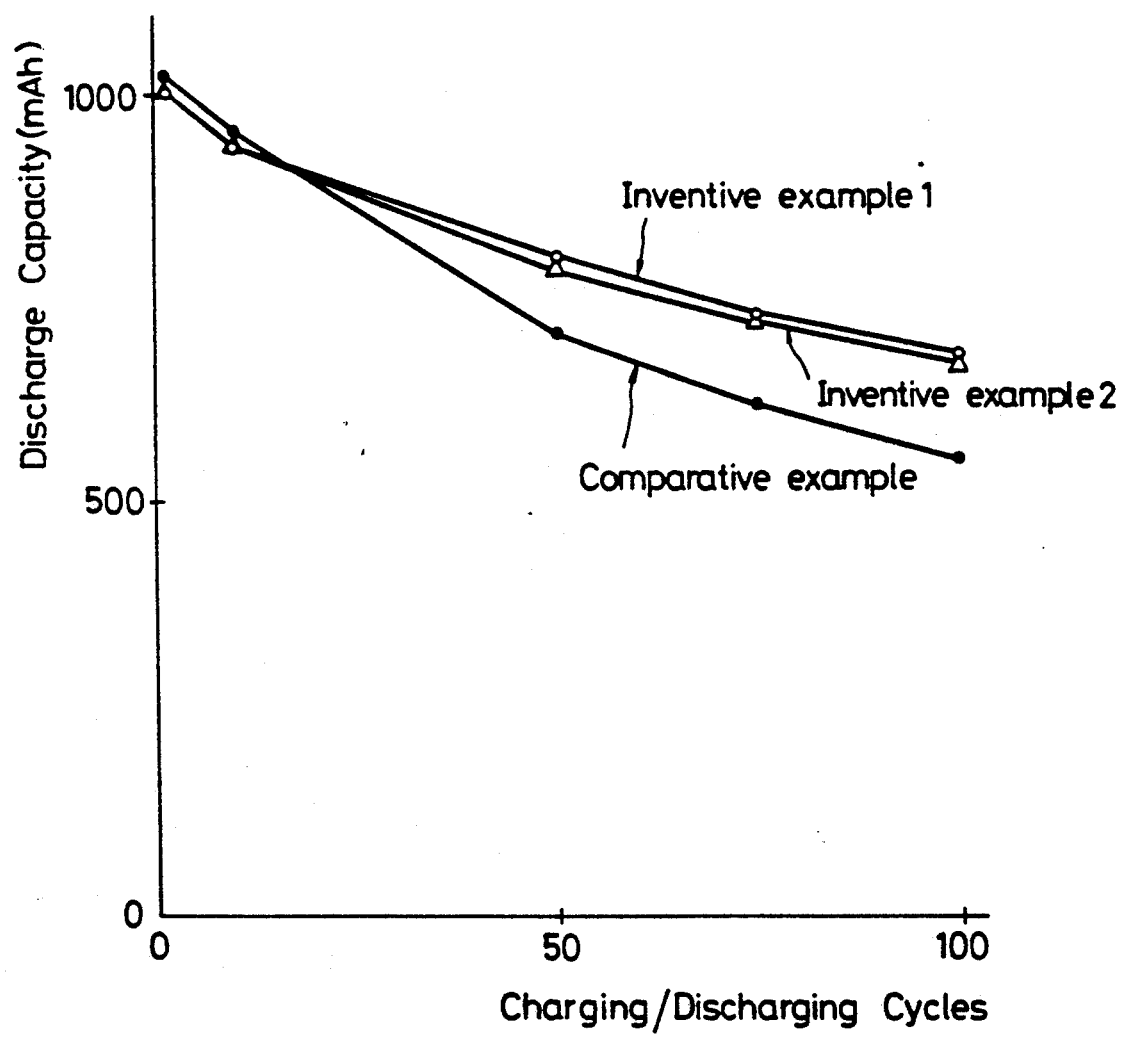
FIG. 2 is a graph showing the charging/discharging cyclic performances of inventive and comparative nonaqueous electrolyte secondary batteries.

It can be understood from the above Table and FIG. 2 that the discharge capacity is prevented from being lowered by adding an absorbent of a free acid such as $Al_2O_3$ or BaO, and the battery performances are improved. The batteries according to Inventive Examples 1 and 2 exhibits an improved charging/discharging cyclic performance, a increased useful life, and an increased dielectric strength, and the electrolytic solutions thereof are prevented from being decomposed or degraded.

If the additives according to the present invention are added to electrolytic solutions, then it is possible to increase the useful life of the electrolytic solutions irrespective of whether the ambient temperature is high or normal.

The free acid produced in the electrolytic solutions in the batteries according to the Inventive Examples 1 and 2 was measured after the charging/discharging cycles. The free acid in the electrolytic solution with $Al_2O_3$ added according to the Inventive Example 1 increased up to only 150 ppm, and the free acid in the electrolytic solution with BaO added according to the Inventive Example 2 increased up to only 200 ppm. It can be understood from the foregoing that the generation of the free acid is suppressed after the charging/discharging cycles at high temperatures according to Inventive Examples 1 and 2.

The addition of $Al_2O_3$ and BaO does not substantially affect the battery performances, particularly the useful life of the battery. Furthermore, since the electrolytic solution is not greatly decomposed or degraded even when the battery is used at a high temperature and a high voltage of 4 V or more, the battery can be used over a long period of time.

While $Al_2O_3$ or BaO is added to the electronic solution in the above embodiment, MgO may also be added as an additive capable of absorbing a large amount of free acid without adversely affecting the charging and discharging of the battery.

The organic solvent of the electrolytic solution is not limited to propylene carbonate and 1,2-dimethoxyethane, but may be ethylene carbonate, butylene carbonate, γ-buthyrolactone, 1,2-diethoxyethane, tetrahydrofuran, 2-methyltetrahidrofuran, 1,3-dioxolane, 4-methyl-1,3-dioxolane, diglyme, sulfolane, acetonitrile, dimethyl carbonate, diethyl carbonate, or dipropyl carbonate, or a mixture of two or more of these substances.

The electrolyte may be $LiAsF_6$, $LiBF_4$, or the like other than $LiPF_6$.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A nonaqueous electrolyte secondary battery comprising:
   a casing;
   a cathode disposed in said casing, said cathode being made of a carbon material that can be doped or undoped with lithium;
   an anode disposed in said casing, said anode being made of a primary active material composed of a composite oxide of lithium and cobalt;
   an electrolytic solution accommodated in said casing, said electrolytic solution being composed of an organic solvent with an electrolyte of a fluoride added thereto; and
   an additive added to said electrolytic solution, said additive comprising at least one oxide selected from the group consisting of $Al_2O_3$, BaO, and MgO.

2. A nonaqueous electrolyte secondary battery according to claim 1, wherein said fluoride is selected from the group consisting of $LiPF_6$, $LiAsF_6$, and $LiBF_4$.

* * * * *